United States Patent [19]
Kirner et al.

[11] 4,115,055
[45] Sep. 19, 1978

[54] MIXTURE OF WATER-INSOLUBLE MONOAZO DYESTUFFS FOR COLORING TEXTILE MATERIALS CONSISTING AT LEAST PARTLY OF LINEAR, AROMATIC POLYESTERS

[75] Inventors: Hans Dieter Kirner, Pratteln; Albert Bitterlin, Birsfelden; Ekkehard Walter Müller, Pratteln, all of Switzerland

[73] Assignee: Rohner AG Pratteln, Pratteln, Switzerland

[21] Appl. No.: 670,548

[22] Filed: Mar. 25, 1976

[30] Foreign Application Priority Data

Mar. 26, 1975 [CH] Switzerland ............... 3901/75

[51] Int. Cl.$^2$ ............................................. C09B 27/00
[52] U.S. Cl. ............................................. 8/26; 8/41 C; 8/179
[58] Field of Search ........................... 8/26, 41 C

[56] References Cited

U.S. PATENT DOCUMENTS

| | | | |
|---|---|---|---|
| 3,043,647 | 7/1962 | Kopp et al. | 8/26 |
| 3,383,160 | 5/1968 | Stanley et al. | 8/179 |

FOREIGN PATENT DOCUMENTS

| | | |
|---|---|---|
| 1,199,732 | 1/1958 | Fed. Rep. of Germany. |
| 1,225,138 | 5/1967 | Fed. Rep. of Germany. |
| 1,285,443 | 8/1969 | Fed. Rep. of Germany. |
| 1,131,639 | 12/1959 | Fed. Rep. of Germany. |
| 912,290 | 12/1962 | United Kingdom. |
| 961,446 | 6/1964 | United Kingdom. |
| 967,893 | 8/1964 | United Kingdom. |

Primary Examiner—A. Lionel Clingman
Attorney, Agent, or Firm—Dayton R. Stemple, Jr.

[57] ABSTRACT

Mixtures of at least two water-insoluble monoazo dyestuffs of the formula:

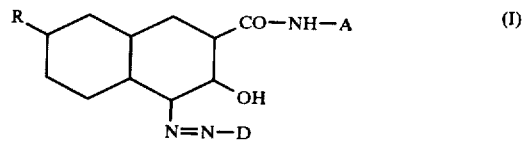

wherein D is the residue of a diazo component of the benzene series free from sulphonic acid and carboxyl groups which may be substituted with one or more optionally substituted alkyl, alkoxy, alkoxyalkyl, acyloxy, alkylcarbonyl and/or alkoxycarbonyl groups and/or one halogen atom, R is hydrogen, halogen or an optionally substituted alkoxy group and A is an aromatic radical which may be substituted with one or two optionally substituted alkyl and/or alkoxy groups and/or one halogen atom, can be used for the coloration of textile materials consisting at least partly of linear, aromatic polyesters. The melting points of these mixtures are lower than those of their individual dyestuff components, preferably lower than 200° or 180° C. They may be used in the form of dyestuff compositions containing said dyestuff mixtures in finely dispersed form with a particle size of less than 5 microns together with a water-soluble dispersing agent.

17 Claims, No Drawings

MIXTURE OF WATER-INSOLUBLE MONOAZO DYESTUFFS FOR COLORING TEXTILE MATERIALS CONSISTING AT LEAST PARTLY OF LINEAR, AROMATIC POLYESTERS

The present invention concerns a mixture of water-insoluble monoazo dyestuffs for colouring textile materials consisting at least partly of linear, aromatic polyesters, in particular polyethylene terephthalate, which mixture is characterized in that it contains at least two monoazo dyestuffs of the formula:

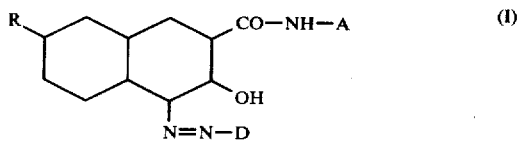

wherein A is an optionally substituted aromatic radical, R is hydrogen, an optionally substituted alkoxy group or halogen and D is the residue of a diazotizable, optionally substituted amine of the benzene series, free from sulphonic acid and carboxyl groups.

The optional substituents of the aromatic radical A are one cyano or alkoxycarbonyl group and/or one halogen atom, but are preferably one or two alkyl and/or alkoxy groups which generally contain 1 to 4 carbon atoms, preferably 1 or 2 carbon atoms, and which can be substituted with cyano, hydroxyl, alkoxy, acyl and/or acyloxy groups and/or halogen, but are preferably unsubstituted.

The substituents of the aromatic group D can be cyanoalkyl, cyano, alkylsulphonyl, trifluoromethyl and/or sulphonamido groups, but are preferably alkyl, alkoxy, alkoxyalkyl, acyloxy, alkylcarbonyl and/or alkoxycarbonyl groups and/or halogen.

To produce the individual azo dyestuffs of formula I or the mixtures according to the invention of such azo dyestuffs, arylamides of acids such as 3-hydroxy-2-naphthoic acid, 7-methoxy-3-hydroxy-2-naphthoic acid or 7-bromo-3-hydroxy-2-naphthoic acid can be used as the azo components. The anilides, toluides, ethylanilides, anisidides, phenetitides, chloroanilides, 2,4-dimethoxyanilides, 2,4-diethoxyanilides, 2,5-dimethoxyanilides, 2,5-diethoxyanilides and 2,5-dimethoxy-4-chloroanilides of said acids are suitable for instance.

Suitable diazo components are for instance aniline, the isomeric toluidines, ethylanilines, anisidines, phenetidines, chloroanilines, cresidines, chlorocresidines, chloroanisidines, aminoacetophenones, aminobenzonitriles and the methyl and ethyl esters of aminobenzoic acid.

Some of the dyestuffs of formula I have already been proposed for the coloration of linear aromatic polyesters. Some of them are disclosed in the German patent Nos. 1,131,639; 1,199,732; 1,225,138 and 1,285,443. These dyestuffs are mostly high-melting compounds of predominantly pigment-like nature. When used individually they are not very suitable for coloring textile materials made of linear aromatic polyesters and have thus not proved satisfactory in practice. In particular, they only build up on this sort of fibre slowly and incompletely and it is therefore not possible to obtain deep colours. In many cases the uniformity and fastness to rubbing of the dyeings obtained leave a lot to be desired.

A thorough investigation has shown that the poor dyeing behaviour of the dyestuffs disclosed in the above-mentioned patents can be ascribed principally to their relatively high melting point compared with other disperse dyestuffs. It has further been found that the shortcomings in these dyestuffs caused by their relatively high melting points can be removed by using particular mixtures of the dyestuffs of formula I. These mixtures are described in detail later. Appropriate choice of dyestuff components lowers the melting point of the mixtures to such an extent that it lies significantly below the melting points of the individual components of the mixtures. The rate of exhaustion of the dyebath and the amount of dyestuff which diffuses into the fibres during the dyeing process increases by an extent corresponding to the extent by which the melting point is lowered so that significantly deeper colours are obtained compared with the use of individual dyestuffs.

Lowering the melting point also has a marked effect on the dispersibility of the dyestuff mixtures of the invention and on the stability of the dispersions of these mixtures in the dye-bath. These mixtures thus enable better dyeing results to be achieved in shorter times and at lower dyeing temperatures than is the case with the individual dyestuffs. These dyestuff mixtures are therefore also particularly suitable for high-speed dyeing processes in which extreme demands are placed on the dispersion stability on account of the strong turbulence in the dye-bath and the short heating and dyeing times.

The claimed mixtures of dyestuffs of formula I can comprise any number, but preferably 2, 3 or 4, dyestuffs. The components of such a dyestuff mixture are preferably chosen in such a way that only one or at the most two of the symbols A, R and D have different meanings in the components of the mixtures. With a view to producing clear and brilliant hues, it is preferred to use mixtures containing dyestuffs which give the same shade or very similar shades when used individually. The mixing ratios are suitably chosen so that the melting point of the dyestuff mixture lies in the region of the lowest temperature on the melting point curve, but at least below 200° C and preferably below 180° C. Mixtures of this sort are far superior to their individual components and always give considerably deeper colours on textiles made of linear aromatic polyesters than do the individual components under analogous conditions. In many cases the dyeings obtained with the claimed mixtures have better fastness to light, thermal fixation (such as in Thermosol dyeing) and rubbing than dyeings obtained using the individual components of the mixtures. The claimed dyestuff mixtures are industrially of great interest. They can be produced cheaply from readily available intermediates and give deep, fast and mainly brilliant shades in the orange, red and bordeaux regions in particular. According to the prior art, these shades can only be satisfactorily obtained by using much more expensive disperse dyestuffs.

The mixtures of dyestuffs of formula I can be produced by mixing together the individual dyestuffs which can be isolated beforehand if desired. A particularly advantageous embodiment of the manufacture of such mixtures comprises using mixtures of starting components for the synthesis of the azo dyestuffs. One can for instance proceed by diazotizing a diazo component or a mixture of several diazo components of the formula:

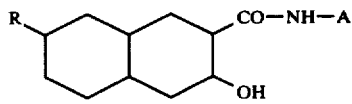

wherein D is as defined previously, and coupling in alkaline solution or suspension with an azo component or a mixture of several azo components of the formula:

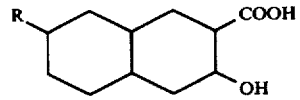

wherein A and R are as defined previously.

Furthermore, the individual dyestuffs of formula I or mixtures of them can be produced by diazotizing a diazo component or a mixture of diazo components of the formula:

D—NH₂  (II)

wherein D is as defined previously, and coupling in alkaline solution or suspension with an azo component or a mixture of several azo components of the formula:

(IV)

wherein R is as defined previously, subsequently converting the carboxyl group to a carboxylic acid halide group in the usual way and reacting the carboxylic acid halide so obtained with an aromatic amine or a mixture of several aromatic amines of the formula:

A—NH₂  (V)

wherein A is as defined above, in the usual way to give a dyestuff or a mixture of dyestuffs of formula I.

The mixtures of dyestuffs of formula I are best used in finely dispersed form. Conventional methods can be used to prepare dyestuff compositions, e.g. by grinding them in the presence of water and dispersing agents. The compositions may be vacuum or spray dried to form dry compositions which can be used, together with water and any dyeing and printing auxiliaries usually added, for dyeing in short or long liquor, impregnating or printing.

Polyester textile materials can be coloured with the claimed dyestuff mixtures from an aqueous bath either at temperatures around the boiling point and at atmospheric pressure or at temperatures above the boiling point, e.g. at 105° to 140° C, in an autoclave at elevated pressure. In order to obtain deeper shades it is convenient to use fibre-swelling agents — so-called carriers — when the colouration is carried out at temperatures around the boiling point. Examples of these agents are alkylesters of aromatic carboxylic acids, chlorinated benzenes, o- or p-phenylphenol and aromatic hydrocarbons such as biphenyl or tetrahydronaphthalene.

A further embodiment comprises impregnating polyester textile materials continuously in an aqueous bath which can contain suitable auxiliaries as well as the claimed dyestuff mixtures, drying and then fixing the dyestuffs in the fibres by means of dry heat or by steaming under pressure.

To print polyester textile materials in accordance with the invention, printing pastes can be used which contain the usual thickeners and printing auxiliaries as well as the claimed dye mixtures in finely dispersed form. Fibre-swelling agents may also be added to these printing pastes. The fibre-swelling agents may be p- and o-phenylphenol or butyl salicylate for instance. Common thickeners are alginates, crystal gum and locust bean and guar derivatives.

In the following Examples, parts are by weight and the ratio parts by volume/parts by weight is liter/kilograms.

EXAMPLE 1

24.4 parts of an equimolar mixture of the o-anisidide, the p-anisidide, the o-phenetedide and the 2,5-dimethoxyanilide of 2,3-hydroxynaphthoic acid are dissolved in a mixture consisting of 200 parts by volume of water, 120 parts by volume of denatured alcohol and 20 parts by volume of 32.5% caustic soda solution at room temperature.

8 parts of aniline are diazotized in the usual way with 6.4 parts of sodium nitrite in the presence of hydrochloric acid. Excess nitrite is decomposed with 1 part of amidosulphonic acid, and the resulting diazonium salt solution filtered and added portion-wise over a period of 30 minutes to the alkaline solution of the azo components. The coupling reaction begins immediately, and the dyestuff mixture thus formed precipitates. On completion of the reaction the precipitate is filtered off and washed with water until the washings are neutral. After drying, 31 parts of dyestuff mixture are obtained as an orange powder. This corresponds to a yield of 95% of theoretical. The dyestuff mixture obtained in this way melts in the range 160° to 170° C.

25 parts of the dried dyestuff mixture, 10 parts of lignin sulphonate and 65 parts by volume of water are ground in a ball mill until the average particle size of the dyestuffs is less than 1 micron. The aqueous dispersion so obtained can be added in this form directly to dyebaths or printing pastes or transformed into a powdery composition by spray drying.

3.27 parts of the aqueous dispersion so obtained and 2 parts of sodium dinaphthylmethanedisulphonate are added to 1000 parts by volume of water at 50° C and the resulting dispersion homogenised by stirring. 50 parts of polyethylene terephthalate fibres in the form of textured threads are placed in this bath and dyed for 90 minutes at 130° C and under pressure. After rinsing, washing and drying, an even dyeing of a brilliant orange shade is obtained which is significantly deeper and faster to rubbing than the dyeing obtained with the nearest comparable dyestuff described in German patent No. 1,131,639, which melts at over 200° C, in equimolar concentration in an analogous process.

EXAMPLE 2

An equimolar mixture is prepared from the individual dyestuffs having the formulae given below:

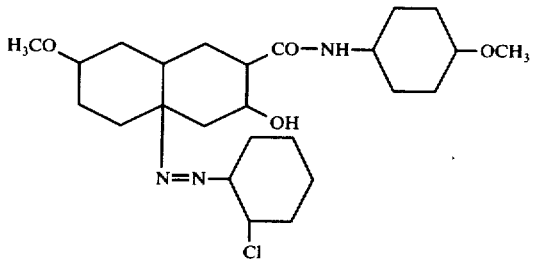
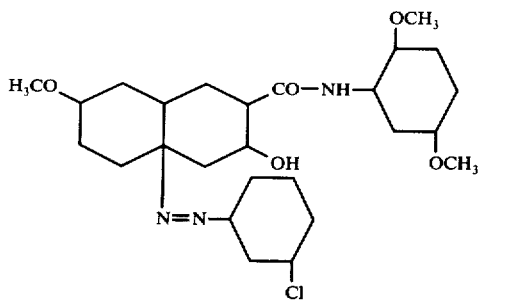
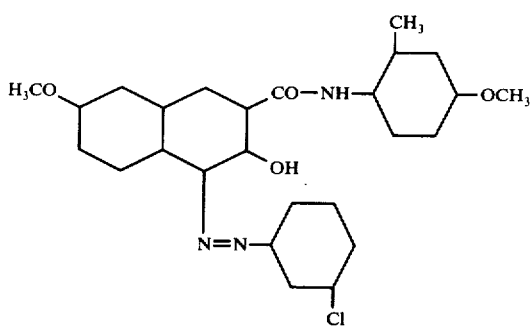
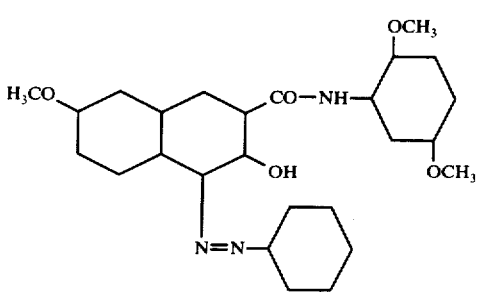

The melting point of this mixture is 160° to 165° C. 25 parts of this dyestuff mixture are converted to an aqueous dispersion by the method described in Example 1. 3.8 parts of the dispersion so obtained and 2 parts of the sodium salt of castor oil sulphonic acid are added to 750 parts of water at 50° C and the resulting dispersion homogenised by stirring. 50 parts of polyethylene terephthalate fibres in the form of tops are placed in this bath and dyed for 60 minutes at 130° C and under pressure. After rinsing, washing and drying an even, deep red dyeing is obtained which is fast to light, thermal fixation and rubbing and which is considerably deeper than dyeings which can be obtained with the individual dyestuffs in analogous fashion.

EXAMPLE 3

27 parts of an azo component of the formula:

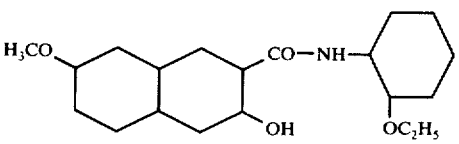

are dissolved in 120 parts by volume of denatured alcohol, 200 parts by volume of water and 20 parts by volume of 32.5% caustic soda solution. 12.2 parts of an equimolar mixture of o-chloroaniline and the methyl ester of anthranilic acid are diazotized at 0° C in aqueous solution in the usual way in the presence of 22 parts by volume of 36% hydrochloric acid and 6.4 parts of sodium nitrite. Excess nitrite is destroyed with 1 part of amidosulphonic acid, the solution of the mixture of diazonium salts so obtained filtered and added portionwise over a period of 30 minutes to the alkaline azo component solution. The coupling reaction begins immediately and the mixture of dyestuffs formed precipitates. On completion of the reaction the precipitate is filtered off and washed with hot water until the washings are neutral. After drying, 36.3 parts of dyestuff mixture are obtained with a melting point of 160° to 170° C.

25 parts of this mixture are brought into aqueous dispersion in the way described in Example 1. Polyethylene terephthalate fibres in the form of a textured knitted fabric are dyed in the way described in Example 1 using 3.9 parts of the aqueous dispersion so obtained. A very deep and brilliant red dyeing is obtained with excellent fastness to light, thermal fixation and rubbing. Dyeings produced in analogous fashion using the individual dyestuffs are significantly less deep and have a markedly lower fastness to rubbing in comparison.

EXAMPLE 4

Instead of the azo component used in Example 3, 25.9 parts of the 2,5-dimethoxyanilide of 2,3-hydroxynaphthoic acid are employed. 9.2 parts of a mixture of equal parts of o- and p-toluidine are used as the diazo component. The method is otherwise the same. 34 parts of a scarlet powder are obtained which melts at 150° to 155° C.

This powder is converted to an aqueous dispersion containing 25% dyestuff in the way described in Example 1. Using 3.5 parts of the dispersion so obtained, a continuous filament yarn of polyethylene terephthalate fibres is dyed in the way outlined in Example 2. A very deep, brilliant scarlet shade is obtained with excellent fastness to light, thermal fixation and rubbing. The dyeing has a better fastness to light and is considerably deeper than an analogous dyeing obtained with the nearest comparable individual dyestuff disclosed in German patent No. 1,285,443.

Table I below contains further Examples of mixtures of dyestuffs of the general formula I which, according to their composition, can be prepared and used in the ways described in Examples 1 to 4.

Table I

| Example | Equimolar mixtures of | Melting point and shade on polyester |
|---|---|---|
| 5 | (structures) | 165° C brilliant orange |
| 6 | (structures) | 163° C brilliant scarlet |
| 7 | (structures) | 161° C brilliant orange |
| 8 | (structures) | 141° C brilliant scarlet |
| 9 | (structures) | 157° C brilliant scarlet |

Table I-continued

| Example | Equimolar mixtures of | | | Melting point and shade on polyester |
|---|---|---|---|---|
| 10 | [structure: naphthalene-CO-NH-cyclohexyl(OCH₃, OCH₃), OH, N=N-phenyl-OCH₃] | [structure: naphthalene-CO-NH-cyclohexyl(OCH₃, OCH₃), OH, N=N-phenyl-OCH₃] | | 148° C brilliant red |
| 11 | [structure: naphthalene-CO-NH-cyclohexyl(OCH₃, OCH₃), OH, N=N-phenyl-OC₂H₅] | [structure: naphthalene-CO-NH-cyclohexyl(OCH₃, OCH₃), OH, N=N-phenyl-OC₂H₅] | | 157° C brilliant red |
| 12 | [structure: naphthalene-CO-NH-cyclohexyl(OCH₃, OCH₃), OH, N=N-phenyl-OCH₃] | [structure: naphthalene-CO-NH-cyclohexyl(OCH₃, OCH₃), OH, N=N-phenyl-OC₂H₅] | [structure: naphthalene-CO-NH-cyclohexyl(OCH₃, OCH₃), OH, N=N-phenyl-OC₂H₅] | 147° C brilliant red |
| 13 | [structure: naphthalene-CO-NH-cyclohexyl(OCH₃, CH₃), OH, N=N-phenyl-COOCH₃] | [structure: naphthalene-CO-NH-cyclohexyl(C₂H₅), OH, N=N-phenyl-COOCH₃] | [structure: naphthalene-CO-NH-cyclohexyl(OCH₃, OCH₃), OH, N=N-phenyl-COOCH₃] | 180° C brilliant orange |

Table I-continued

| Example | Equimolar mixtures of | Melting point and shade on polyester |
|---|---|---|
| 14 | (structures shown) | 142° C brilliant red |
| 15 | (structures shown) | 149° C brilliant red |
| 16 | (structures shown) | 161° C brilliant red |

EXAMPLE 17

120 parts of the aqueous, finely dispersed dyestuff composition obtained in Example 1 are mixed with 880 parts of an aqueous 3% carboxymethylcellulose solution. This printing paste is very suitable for printing on woven polyester fabrics. After printing in the conventional way, the fabric is dried at 100° to 110° C and treated for 30 seconds with hot, dry air at 220° C. The fabric is then rinsed, washed and rinsed again. A deep print of a brilliant orange shade which is fast to rubbing is obtained.

EXAMPLE 18

85 parts of the aqueous, finely dispersed dyestuff composition obtained in Example 4, 20 parts of an acrylic acid amide polymer and 895 parts of an aqueous 0.3% sodium alginate solution are mixed together. The resultant padding liquor is used to pad a woven polyester fabric at 20° C which is subsequently squeezed out to 60% pick up. After drying the dyed fabric at 100° to 110° C, it is treated with hot, dry air for 45 seconds at 210° C to fix the dyestuff. The fabric is then rinsed, washed and rinsed again. An intense colour of a brilliant scarlet shade is obtained.

Table II below contains further Examples of mixtures of dyestuffs of the general formula I which, according to their composition, can be prepared and used in the ways described in Examples 1 to 4.

Table II

| Ex. | Mixture of | | | | Melting point / Mixing ratio / Shade on polyester |
|---|---|---|---|---|---|
| 19 | | | | | 146° C / 2:1:1:3:2 / brilliant orange |
| 20 | | | | | 156° C / 2:3:4 / brilliant orange |
| 21 | | | | | 144° C / 7:3 / brilliant scarlet |
| 22 | | | | | 140° C / 4:2:3 / brilliant scarlet |
| 23 | | | | | 168° C / 1:1 / brilliant scarlet |

Table II-continued

| Ex. | Mixture of | | | | Melting point / Mixing ratio / Shade on polyester |
|---|---|---|---|---|---|
| 24 | [naphthol-CO-NH-C6H4-OCH3, azo-C6H4-Cl structure] | [naphthol-CO-NH-C6H3(OCH3), azo-C6H3(Cl) structure] | | | 174° C<br>3 : 2<br>brilliant scarlet |
| 25 | [naphthol-CO-NH-C6H4-OCH3, azo-C6H3(CH3)(Cl)] | [naphthol-CO-NH-C6H3(OCH3)(CH3), azo-C6H3(CH3)(Cl)] | [naphthol-CO-NH-C6H3(OCH3), azo-C6H3(CH3)(Cl)] | | 180° C<br>3 : 2 : 3<br>brilliant scarlet |
| 26 | [naphthol-CO-NH-C6H3(OCH3)2, azo-C6H4-CH2CH3] | [naphthol-CO-NH-C6H4-OCH3, azo-C6H4-CH2-CH3] | | | 135° C<br>3 : 1<br>brilliant scarlet |
| 27 | [naphthol-CO-NH-C6H3(OCH3)2, azo-C6H4-CH2-CH3] | [naphthol-CO-NH-C6H3(OCH3)2, azo-C6H4-CH2CH3] | | | 140° C<br>2 : 1<br>brilliant scarlet |

Table II-continued

| Ex. | Mixture of | | | Melting point / Mixing ratio / Shade on polyester |
|---|---|---|---|---|
| 28 | naphthyl-azo dye with CO-NH-(2-OCH₃,5-OC₂H₅-cyclohexyl) and N=N-(2-CH₂CH₃-cyclohexyl) | naphthyl-azo dye with CO-NH-(2-OCH₃,5-OCH₃-cyclohexyl) and N=N-(3-OCH₃-cyclohexyl) | | 142° C<br>1:3<br>brilliant scarlet |
| 29 | Br-naphthyl-azo dye with CO-NH-(2-OCH₃-cyclohexyl) and N=N-(2-CH(CH₃)₂-cyclohexyl) | naphthyl-azo dye with CO-NH-(2-OCH₃,5-OCH₃-cyclohexyl) and N=N-(2-CH(CH₃)₂-cyclohexyl) | | 147° C<br>3:1:3<br>brilliant scarlet |
| 30 | Br-naphthyl-azo dye with CO-NH-(2-OC₂H₅-cyclohexyl) and N=N-(2-CH₂CH₃-cyclohexyl) | | | 150° C<br>7:3<br>brilliant scarlet |
| 31 | naphthyl-azo dye with CO-NH-(2-OCH₃,3-Cl-cyclohexyl) and N=N-(2-OCH₃,3-Cl-cyclohexyl) | naphthyl-azo dye with CO-NH-(2-OCH₃-cyclohexyl) and N=N-(2-OCH₃,3-Cl-cyclohexyl) | naphthyl-azo dye with CO-NH-(2-OCH₃,4-OCH₃-cyclohexyl) and N=N-(2-OCH₃,3-Cl-cyclohexyl) | 185° C<br>3:1:1<br>brilliant red |

Table II-continued

| Ex. | Mixture of | Melting point / Mixing ratio / Shade on polyester |
|---|---|---|
| 32 | [structures] | 154° C / 1:1 / brilliant red |
| 33 | [structures] | 143° C / 1:3 / brilliant red |
| 34 | [structures] | 146° C / 1:2 / brilliant red |
| 35 | [structures] | 186° C / 1:1 / bordeaux |
| 36 | [structures] | 161° / 1:1 / bordeaux |

Table II-continued

| Ex. | Mixture of | Melting point / Mixing ratio / Shade on polyester |
|---|---|---|
| 37 | (three azo dye structures shown) | 168° C / 3:2 / bordeaux |
| 38 | (three azo dye structures shown) | 154° C / 3:2:3 / bordeaux |
| 39 | (two azo dye structures shown) | 191° C / 1:1 / garnet |

What we claim is:

1. A composition for coloring textile materials consisting at least partly of linear, aromatic polyesters, comprising a mixture having a melting point below 200° C and containing at least two water-insoluble monoazo dyestuffs of the formula

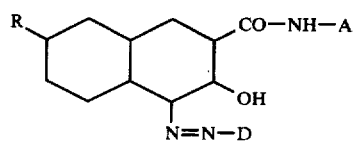

wherein
R is hydrogen, halogen or an alkoxy group,
A is an aromatic radical substituted with 0 to 1 halogen and 0 to 2 alkyl and alkoxy groups, and
D is the residue of a diazonium compound of the benzene series free from sulphonic acid and carboxyl groups which may be substituted with halogen and one or more alkyl, alkoxy, alkoxyalkyl, acyloxy and alkoxycarbonyl groups.

2. The composition of claim 1 wherein said aromatic radical of A is a phenyl group.

3. The composition of claim 1 that is produced by coupling one diazonium compound with a mixture of coupling components, a mixture of diazonium compounds with one coupling component, or a mixture of diazonium compounds with a mixture of coupling components.

4. The composition of claim 1 wherein the mixture of dyestuffs has different moieties for two of D, R and A.

5. The composition of claim 1 wherein the mixture of dyestuffs has different moities for one of D, R and A.

6. The composition of claim 1 wherein the mixture of dyestuffs have different moieties for each of D, R and A.

7. The composition of claim 1 wherein said melting point is below 180° C.

8. The composition of claim 1 which is in finely dispersed form with a particle size of less than 5 microns together with a water-soluble dispersing agent.

9. A process for coloring textile materials consisting at least partly of linear, aromatic polyesters, comprising applying the composition of claim 1 thereto.

10. A process for coloring textile materials consisting at least partly of linear, aromatic polyesters, comprising applying the composition of claim 8 thereto.

11. A textile material consisting at least partly of linear, aromatic polyesters and colored by the process of claim 9.

12. A textile material consisting at least partly of linear, aromatic polyesters and colored by the process of claim 10.

13. The composition of claim 7 wherein said mixture contains

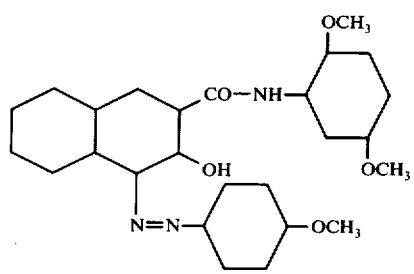

and

14. The composition of claim 7 wherein said mixture contains

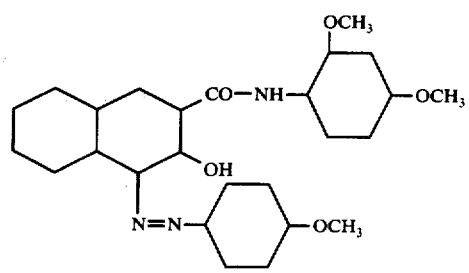

15. The composition of claim 7 wherein said mixture contains

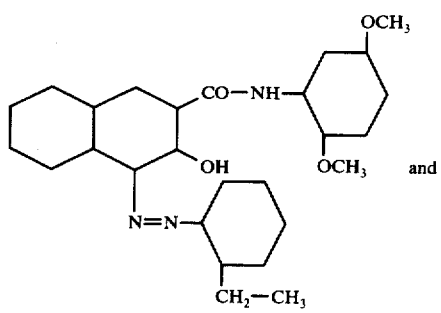

and

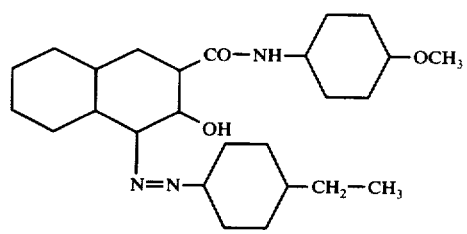

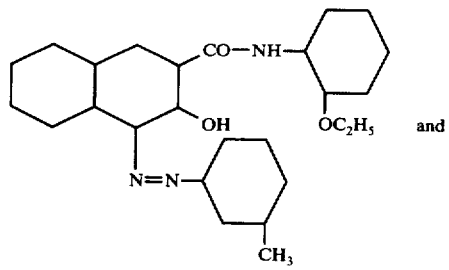

and

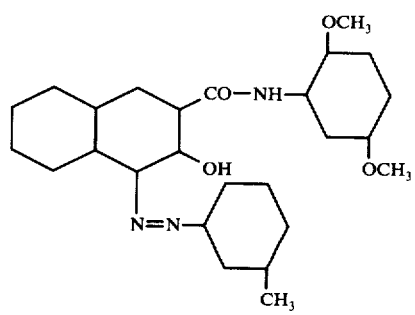

16. The composition of claim 7 wherein said mixture contains

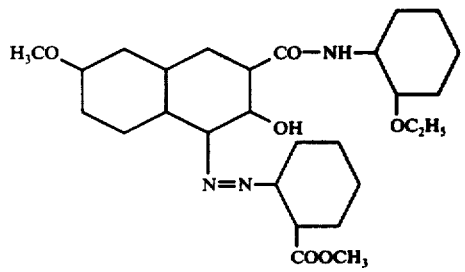
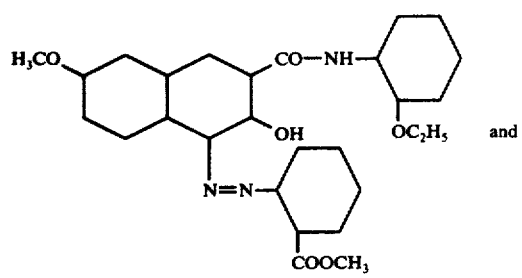
and
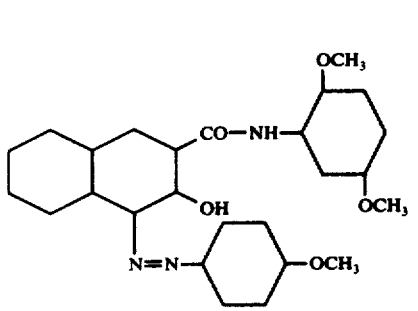
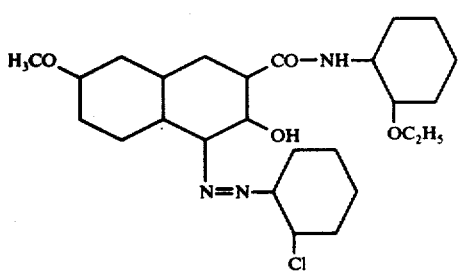
* * * * *
17. The composition of claim 7 wherein said mixture contains

UNITED STATES PATENT OFFICE
CERTIFICATE OF CORRECTION

PATENT NO. : 4,115,055
DATED : September 19, 1978
INVENTOR(S) : Hans Dieter Kirner et al.

It is certified that error appears in the above-identified patent and that said Letters Patent are hereby corrected as shown below:

Column 5, lines 1-25, correct both formulas to show as follows:

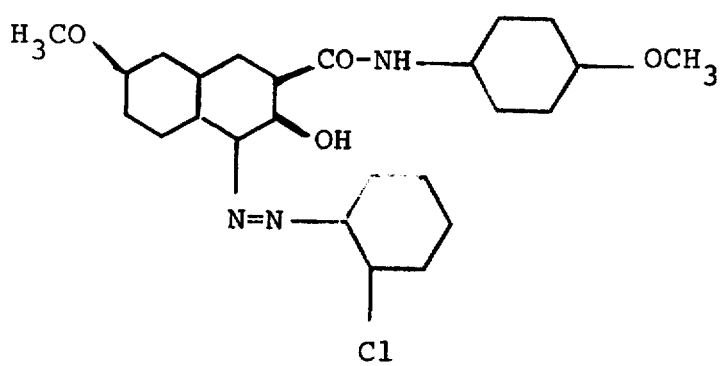

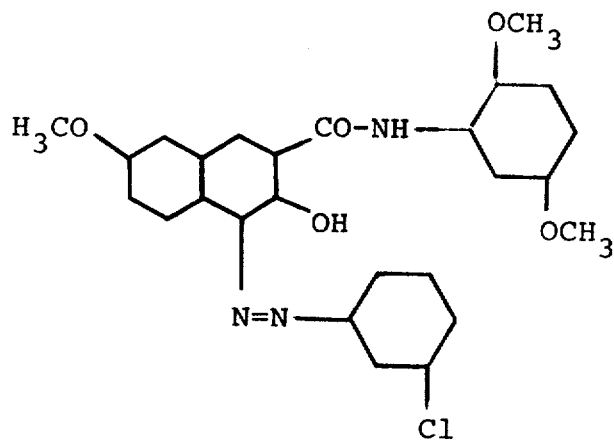

UNITED STATES PATENT OFFICE
CERTIFICATE OF CORRECTION

PATENT NO. : 4,115,055
DATED : September 19, 1978
INVENTOR(S) : Hans Dieter Kirner et al.

It is certified that error appears in the above-identified patent and that said Letters Patent are hereby corrected as shown below:

Column 7, Example 6, correct first formula (at bottom of column) to show as follows:

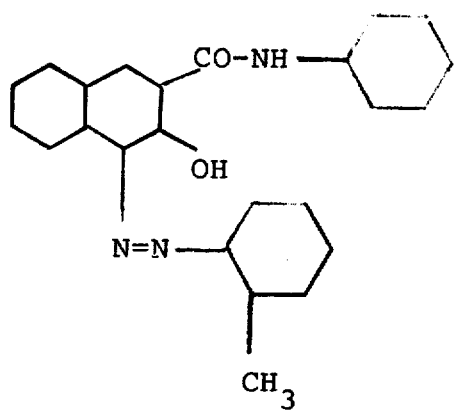

Signed and Sealed this

Thirteenth Day of February 1979

[SEAL]

Attest:

RUTH C. MASON
*Attesting Officer*

DONALD W. BANNER
*Commissioner of Patents and Trademarks*